United States Patent
Faulkner et al.

(10) Patent No.: US 9,255,518 B2
(45) Date of Patent: Feb. 9, 2016

(54) SYSTEM AND METHOD FOR AN AFTERCOOLER BYPASS

(71) Applicant: Norfolk Southern Corporation, Norfolk, VA (US)

(72) Inventors: Donald R. Faulkner, Hollidaysburg, PA (US); William B. Thompson, Altoona, PA (US)

(73) Assignee: Norfolk Southern Corporation, Norfolk, VA (US)

( * ) Notice: Subject to any disclaimer, the term of this patent is extended or adjusted under 35 U.S.C. 154(b) by 77 days.

(21) Appl. No.: 14/062,018

(22) Filed: Oct. 24, 2013

(65) Prior Publication Data

US 2015/0113978 A1   Apr. 30, 2015

(51) Int. Cl.
*F02B 29/04* (2006.01)
*F01P 7/14* (2006.01)

(52) U.S. Cl.
CPC ......... *F02B 29/0475* (2013.01); *F02B 29/0418* (2013.01); *F02B 29/0493* (2013.01)

(58) Field of Classification Search
CPC ....... F01P 2007/146; F01P 7/16; F01P 7/167; F01P 2025/13; F02B 29/0418; F02B 29/0493; Y02T 10/144
USPC .................................. 60/599; 123/41.09, 563
See application file for complete search history.

(56) References Cited

U.S. PATENT DOCUMENTS

| | | | |
|---|---|---|---|
| 3,863,612 A | 2/1975 | Wiener | |
| 4,236,492 A * | 12/1980 | Tholen | 123/563 |
| 4,322,630 A * | 3/1982 | Mezera et al. | 290/40 C |
| 4,517,929 A | 5/1985 | Musick et al. | |
| 4,550,692 A | 11/1985 | Crofts, Sr. | |
| 4,697,551 A * | 10/1987 | Larsen et al. | 123/41.31 |
| 5,598,705 A | 2/1997 | Uzkan | |
| 5,669,363 A | 9/1997 | Francis | |

(Continued)

FOREIGN PATENT DOCUMENTS

| | | |
|---|---|---|
| EP | 1445454 | 8/2004 |
| EP | 1447549 | 8/2004 |

(Continued)

OTHER PUBLICATIONS

International Search Report (Feb. 5, 2015).

(Continued)

*Primary Examiner* — Audrey K Bradley

(74) *Attorney, Agent, or Firm* — Goodwin Procter LLP

(57) ABSTRACT

Embodiments of systems and methods for bypassing an aftercooler are disclosed. According to one embodiment, the bypass valve system may include a turbocharger, an air temperature sensor, an aftercooler, a three-way bypass valve, an aftercooler conduit, a bypass conduit, a pipe fitting, an engine, a radiator, an expansion tank, a pump, a bypass control system and a locomotive control system. The temperature of the charge air is measured and sent to the bypass control system. The locomotive control system sends engine throttle conditions, such as engine notch position, to bypass control system. Bypass control system determines whether to circulate coolant through the aftercooler or bypass the aftercooler based on the temperature measurements and the engine throttle conditions. Bypass control system then sends a signal to the bypass valve to either to circulate coolant through the aftercooler or bypass the aftercooler through the conduit.

24 Claims, 2 Drawing Sheets

(56) References Cited

U.S. PATENT DOCUMENTS

| | | | |
|---|---|---|---|
| 5,799,728 A * | 9/1998 | Blume | 165/231 |
| 6,006,731 A | 12/1999 | Uzkan | |
| 6,134,888 A | 10/2000 | Zimmer et al. | |
| 6,336,447 B1 | 1/2002 | Bartel et al. | |
| 6,499,298 B2 | 12/2002 | Uzkan | |
| 6,561,169 B2 | 5/2003 | Sealy et al. | |
| 6,640,543 B1 | 11/2003 | Seal | |
| 6,952,932 B2 | 10/2005 | Goettel et al. | |
| 7,059,278 B2 | 6/2006 | Hedrick et al. | |
| 7,152,588 B2 | 12/2006 | Corba | |
| 7,370,627 B2 | 5/2008 | Mahakul et al. | |
| 7,980,077 B2 | 7/2011 | Johnson | |
| 7,997,067 B2 | 8/2011 | Morita et al. | |
| 8,090,521 B2 | 1/2012 | Goes et al. | |
| 8,103,429 B2 | 1/2012 | Sivasubramaniam et al. | |
| 8,127,722 B2 | 3/2012 | Justin et al. | |
| 8,141,349 B2 | 3/2012 | Morita et al. | |
| 8,417,484 B2 | 4/2013 | Ringeisen | |
| 2003/0015183 A1 * | 1/2003 | Sealy et al. | 123/563 |
| 2004/0069284 A1 * | 4/2004 | Corba | 123/563 |
| 2005/0193963 A1 | 9/2005 | Hedrick et al. | |
| 2008/0120963 A1 | 5/2008 | Morita et al. | |
| 2008/0120969 A1 | 5/2008 | Morita et al. | |
| 2008/0147295 A1 | 6/2008 | Sivasubramaniam et al. | |
| 2010/0154730 A1 * | 6/2010 | Scolton et al. | 123/41.09 |
| 2010/0299923 A1 | 12/2010 | Johnson | |
| 2011/0061629 A1 | 3/2011 | Goes et al. | |
| 2012/0089278 A1 | 4/2012 | Goes et al. | |
| 2013/0055711 A1 * | 3/2013 | Hofer et al. | 60/602 |
| 2013/0333636 A1 * | 12/2013 | Geradts et al. | 123/2 |

FOREIGN PATENT DOCUMENTS

| | | | |
|---|---|---|---|
| EP | 1571324 | 9/2005 | |
| EP | 2375035 | 10/2011 | |
| WO | WO-2008079548 | 7/2008 | |
| WO | WO 2012113824 A1 * | 8/2012 | F02G 5/02 |

OTHER PUBLICATIONS

Written Opinion (Feb. 5, 2015).

* cited by examiner

SYSTEM AND METHOD FOR AN AFTERCOOLER BYPASS

FIELD OF THE INVENTION

The present invention is in the field of locomotive diesel engines and cooling systems. More particularly, the present invention relates to a cooling apparatus for bypassing an aftercooler and related system and method.

BACKGROUND

Locomotive diesel engines often include turbochargers to produce higher power output, lower emissions levels, and improve efficiency. However, when a turbo charger compresses intake air and outputs charge air, the temperature of the charge air is typically higher than the temperature of the intake air. The temperature of the charge air also typically increases as locomotive throttle notch or locomotive speed increases. Generally, locomotive diesel engines are equipped with aftercoolers (i.e., a "liquid-to-air heat exchanger," or "intercooler") that lower the increased temperature of the charge air by transferring heat to liquids. Typically, charge air temperature is lowered by passing through an aftercooler. The temperature of the charge air as it passes through an aftercooler may be lowered by controlling the flow of coolant through the aftercooler.

Although aftercoolers typically lower charge air temperature, at low locomotive throttle notches or speeds, the temperature of the ambient air may be lower than the temperature of the coolant circulating through the aftercooler. As a result, passing charge air through an aftercooler under these conditions has the adverse effect of warming the charge air.

Prior art systems exist that enable the flow of an engine's charge air to be bypassed around an aftercooler under certain conditions. However, these bypass systems typically require additional piping to circumvent the charge air around the aftercooler. Thus, these charge air systems are typically impracticable or inefficient to include in systems with confined spatial requirements.

Other prior art systems exist that reduce or stop the flow rate of coolant to an aftercooler by reducing or stopping the flow rate of the coolant throughout a coolant loop. However, when coolant flow is reduced or stopped in these prior art systems, the coolant flow is also reduced or stopped to other components in the coolant loop, such as radiators, engines, etc.

Accordingly, there is a need to efficiently prevent the unintentional warming of charge air in a diesel engine when an engine's charge air is colder than the temperature of the coolant circulating through the aftercooler.

Other drawbacks exist.

SUMMARY

Embodiments of the present invention are directed to systems and methods for controlling the coolant in an internal combustion engine to bypass an aftercooler under certain engine operating conditions. According to one embodiment of the invention, the system may include a turbocharger, an aftercooler, an aftercooler conduit, a coolant bypass conduit, temperature sensors for measuring air temperature, a coolant pump, and a bypass valve for controlling a flow of the coolant to either the aftercooler conduit or bypass conduit. The circulation of coolant may be controlled with a bypass valve. A bypass control system processes engine operating conditions, such as air temperature, and throttle conditions, and controls whether to bypass or circulate coolant to the aftercooler via the bypass valve. Coolant pump may continuously circulate coolant through the coolant loop as the bypass valve outputs coolant to either the aftercooler or bypass conduit. The bypass control system may optionally process coolant temperature to determine whether to bypass or circulate coolant to the aftercooler via the bypass valve.

Various technical effects can be achieved by the present invention. For example, by bypassing the coolant around the aftercooler, the aftercooler avoids the adverse effect of warming charge air when the coolant is warmer than the charge air or ambient air temperature, without changing the flow of the charge air. Further, diverting coolant through a bypass conduit enables the charge air to be cooled by ambient air temperature. The temperature of the engine's air box is also reduced, which in turn, improves engine combustion and fuel consumption, and lowers NOx emissions.

Additional features and advantages of the invention will be set forth in the description that follows, and in part will be apparent from the description, or may be learned by practice of the invention.

BRIEF DESCRIPTION OF THE DRAWINGS

The accompanying drawings are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings wherein.

DETAILED DESCRIPTION OF PREFERRED EMBODIMENTS

Embodiments of the present invention provide for improved fuel efficiency and reduced emissions reducing the charge air temperature of a diesel engine by controlling the bypassing or circulating of coolant throughout an engine. An exemplary bypass valve system controls the temperature of diesel charge air by controlling the bypassing or circulation of coolant to an aftercooler based on certain locomotive throttle and temperature conditions. At low locomotive throttle notches or speeds, when the ambient air may be colder than the coolant circulating through the aftercooler, the bypass valve system may reroute coolant to bypass the aftercooler. By bypassing the coolant around the aftercooler, the aftercooler avoids the adverse effect of warming the charge air; rather, the cool charge air temperature is either maintained or reduced by the temperature of the ambient air. The temperature of the engine's air box is also reduced, which in turn, improves engine combustion and fuel consumption, and lowers NOx emissions.

Figure 1:
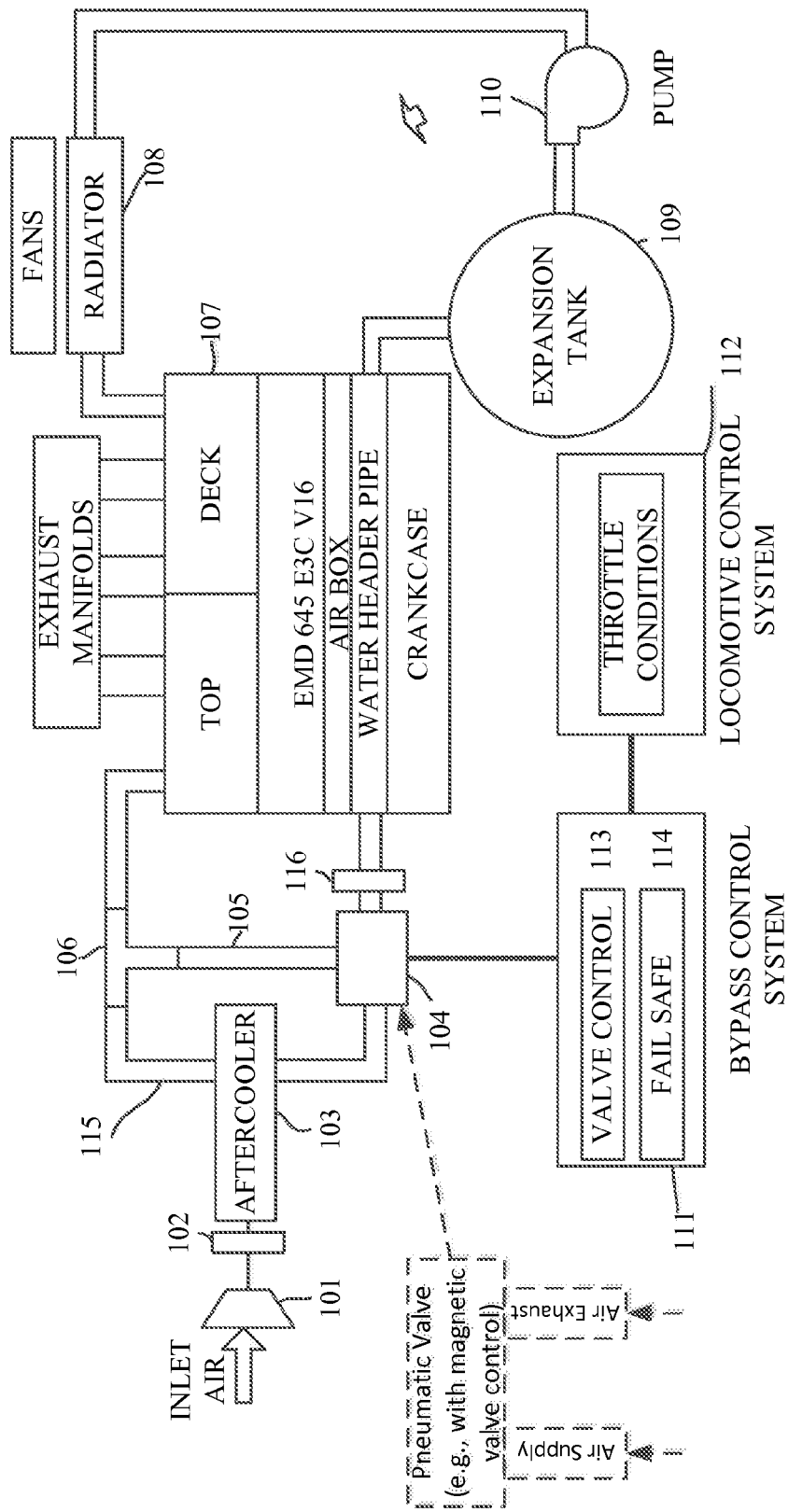
FIG. 1 is a block diagram illustrating a bypass valve system according to one embodiment of the invention.

FIG. 1 illustrates a bypass valve system according to one embodiment of the invention. The bypass valve system may include a turbocharger 101, an air temperature sensor 102, an aftercooler 103, a three-way bypass valve 104, an aftercooler conduit 115, a bypass conduit 105, and a pipe fitting 106, an engine 107, a radiator 108, an expansion tank 109, a pump 110, a bypass control system 111 and a locomotive control system 112. The system may optionally include a coolant temperature sensor 116.

Generally, the operation of the bypass valve system is as follows. Turbocharger 101 compresses intake air and outputs charge air to aftercooler 103. Temperature sensors 102 may measure the temperature of the charge air output by the turbocharger 101, and may send these measurements to bypass control system 111. Locomotive control system 112 sends engine throttle conditions, such as engine notch position, to bypass control system 111. Bypass control system 111 receives and processes the temperature measurements and the engine throttle conditions to determine whether coolant should circulate through aftercooler 103 or bypass the aftercooler 103, by for example, circulating coolant through conduit 105 to pipe fitting 106. If the bypass control system 111 determines that the coolant should bypass aftercooler 103, then bypass control system 111 sends a signal to the bypass valve 104 to divert the coolant from the aftercooler 103 to the bypass conduit 105.

Turbocharger 101 may be an air compressor that compresses intake air for engine 107. The turbocharger 101 compresses intake air and outputs charge air to aftercooler 103. According to some embodiments of the invention, an air temperature sensor 102 for measuring the ambient and/or charge air temperature may be placed at different locations along the air flow path, such as before or after the charge air flows through the aftercooler 103. For example, air temperature sensor 102 may be positioned between the turbocharger 101 and aftercooler 103, at the entrance elbow of the aftercooler 103. In another example, the air temperature sensor 102 may be positioned between the aftercooler 103 and engine 107 at the exit elbow of the aftercooler 103. In a preferred embodiment, the air temperature sensor 102 measures the temperature of airflow passing from the turbocharger to the aftercooler 103. Air temperature sensor 102 communicates air temperature measurements to bypass control system 111 for processing.

According to some embodiments of the invention, aftercooler 103 may be a liquid-to-air heat exchanger for exchanging heat between the charge air and the coolant. Aftercooler 103 may cool the compressed air output by turbocharger 101 with a coolant depending on certain operating conditions. As described in more detailed below, in some embodiments the aftercooler 103 may be supplied with coolant through an aftercooler conduit 115, thereby cooling the charge air. In other embodiments, such as when the coolant temperature is higher than the air temperature, the coolant may be diverted to bypass conduit 105, bypassing the aftercooler conduit 115 and aftercooler 103, as described in more detail below. In this way, the coolant does not cause the adverse effect of warming the charge air.

In one aspect of the invention, coolant is supplied to the aftercooler 103 from a coolant loop circulating coolant through any combination of engine components. For example, according to some embodiments of the invention, the coolant loop may circulate coolant through a bypass valve 104, bypass conduit 105, aftercooler conduit 115, pipe fitting 106, engine 107, radiator 108, expansion tank 109, and coolant pump 110. Coolant circulates through the coolant loop by at least one pump 110, which may be positioned at any location in the loop. In preferred embodiments, the pump may be positioned between expansion tank 109 and radiator 108. According to other embodiments of the invention, the pump maybe positioned between engine 107 and bypass valve 104, or alternatively, pipe fitting 106 and engine 107. According to some embodiments of the invention, pump 110 continuously circulates coolant through the coolant loop. As explained above, some prior art systems disclose controlling the circulation of coolant to an aftercooler by reducing or completely stopping the flow rate of the coolant through the coolant loop. In contrast to these prior art systems, embodiments of the present invention can maintain a continuous and steady flow rate of coolant through the coolant loop while bypassing the aftercooler. The coolant may be any liquid coolant that is a heat transfer fluid, such as water engine oil, engine antifreeze solutions such as propylene or ethylene glycol, or fuel. However, in preferred embodiments, the liquid coolant is water.

According to some embodiments of the invention, a coolant sensor 116 for measuring the temperature of the coolant may be placed at different locations along the coolant path. For example, the coolant sensor 116 may be positioned at a location where coolant enters the bypass valve 104. Coolant temperature sensor 116 may communicate coolant temperature measurements to bypass control system 111 for processing.

According to some embodiments, the circulation of coolant through the aftercooler 103, bypass conduit 105, and aftercooler conduit 115 is controlled by a bypass valve 104. Bypass valve 104 may include an inlet for receiving the coolant from the coolant loop, an outlet for supplying the coolant to the aftercooler 103 via aftercooler conduit 115, and an outlet for supplying the coolant to the bypass conduit 105. Bypass conduit 105 and aftercooler conduit 115 may be constructed of pipe materials well known in the art and suitable for conveying coolants through a combustion engine. Bypass conduit 105 and aftercooler conduit 115 may be constructed with varying different diameters, however, in a preferred embodiment, the bypass conduit 105 and aftercooler conduit 115 is 1" in diameter.

When the bypass valve 104 is operated to circulate coolant through aftercooler 103, coolant is directed from the inlet to the aftercooler conduit 115. When the bypass valve is operated to bypass the aftercooler 103, coolant is directed from the inlet to bypass conduit 105. In one aspect of the invention, when the bypass is operated to switch from one operating condition to another, the system maintains steady and continuous coolant flow throughout the coolant loop. Thus, when operated to bypass the aftercooler, the bypass valve 104 may divert all of the coolant to bypass conduit 105. In one aspect of the invention, when the bypass is operated to divert the coolant to the bypass conduit 105, the charge air and aftercooler 103 may be cooled by the ambient air.

According to some embodiments of the invention, the bypass valve 104 may be an air-operated pneumatic valve or an electronically controlled valve. In embodiments where the bypass valve 104 is an air-operated valve, the bypass valve may include an air supply port and an air exhaust port to control the flow of coolant through the bypass valve. To circulate coolant through the aftercooler, the bypass valve exhausts air via the exhaust port, allowing coolant to flow through conduit 115 and aftercooler 103. To bypass the aftercooler 103, air is supplied to the air supply port from an air supply through an air supply conduit (not pictured) while the exhaust port is closed. A magnet valve may be used to control the flow of air from the air supply to the supply port of the bypass valve 104. The magnet valve controlling the air supply (in turn, controlling the bypass valve 104) may be controlled by bypass control system 111. In embodiments where the bypass valve is an electronically controlled valve, the electronically controlled valve may receive signals from the bypass control system 111 to either circulate coolant to the aftercooler 103 or divert coolant to the bypass conduit 105.

Bypass control system 111 is a control system for controlling the operation of the bypass valve 104. In one aspect of the invention, the bypass control system 111 may receive operating conditions of the locomotive, such as air temperature from temperature sensor 102, and throttle conditions from locomotive control system 112, and determine whether to control the bypass valve 104 to circulate coolant through the aftercooler 103, or bypass conduit 105. For example, the bypass control system 111 may receive the locomotive's throttle notch position from locomotive control system 112, and/or charge air temperature measurements from temperature sensors 102. According to some embodiments of the invention, the bypass control system 111 may optionally receive coolant temperature from a temperature sensor 116 to assist in determining whether to control the bypass valve 104 to circulate coolant through the aftercooler 103, or bypass conduit 105. Throttle conditions may include for example, the locomotive's throttle notch position, or the operating state of a governor, regulator, or similar system for controlling locomotive power and RPM. According to some embodiments, throttle notch positions may include an idle position and eight discrete notch positions. A request to increase the load or speed of the engine may be issued by moving the throttle from a first notch position to a higher notch position. In one aspect of the invention, the bypass control system 111 may be controlled independently from other the control systems of the locomotive, such as the locomotive control system 112 which controls engine throttle conditions.

In one aspect of the invention, the bypass control system 111 may be programmed to control the bypass valve 104 based on temperature and throttle conditions. For example, according to one embodiment, the bypass valve 104 may divert coolant to bypass conduit 105 when the air temperature is lower than the temperature of the liquid coolant. According to another embodiment, bypass control system 111 may control the bypass valve 104 to divert coolant to bypass conduit 105 when the ambient air temperature is lower than a specified temperature. For example, the bypass control system 111 may control the bypass valve 104 to divert coolant to bypass conduit 105 when the ambient air temperature is lower than 70° F. In another embodiment, bypass control system 111 may control the bypass valve 104 to divert coolant to bypass conduit 105 when the throttle conditions exceed a predetermined value. For example, bypass control system 111 may control the bypass valve 104 to divert coolant to bypass conduit 105 when the locomotive throttle is in notches idle through 4, and circulate coolant through aftercooler 103 when the engine throttle is in notches 5 through 8.

In a preferred embodiment of the invention, bypass control system 111 may control the bypass valve 104 to divert coolant to bypass conduit 105 based on a combination of temperature and throttle conditions. For example, bypass control system 111 preferably controls the bypass valve 104 to divert coolant to bypass conduit 105 when the air temperature is above 70° F., and the locomotive throttle is in notches idle through 4. Bypass control system 111 preferably controls the bypass valve 104 to circulate coolant to aftercooler 103 if the air temperature is below 70° F. (and regardless of engine throttle), or if the engine throttle is in notches 5 through 8.

According to one embodiment, the bypass control system 111 may include valve control 113 and fail safe 114. The valve control 113 may control the bypass valve based on the temperature measurements, and throttle conditions. As described above, the valve control 113 may provide the instruction to the bypass valve (e.g., with air supply for pneumatic valves, or electronic signals for an electronic valve) to divert coolant to the aftercooler 103 or bypass conduit 105.

Bypass control system 111 may also include fail safe 114. Fail safe 114 may control the bypass valve 104 in the event that a sensor for detecting operating conditions malfunctions. In one embodiment, fail safe may be programmed to circulate coolant when a temperature sensor malfunctions and the locomotive reaches certain critical throttle notch positions. For example, the fail safe may be programmed to circulate coolant to aftercooler when the throttle is in a position greater than notch 5, regardless of temperature.

Pipe fitting 106 may receive coolant that is either output by the aftercooler 103 through aftercooler conduit 115 or bypass conduit 105 and supply the coolant to the coolant loop. When operating to bypass the aftercooler 103, the pipe fitting passes coolant from the bypass conduit 105 to the coolant loop. When circulating through the aftercooler 103, pipe fitting 106 passes coolant from aftercooler conduit 115 to the coolant loop. In a preferred embodiment of the invention, the pipe fitting may be a welded tee. Pipe fitting 106 may be constructed with varying different diameters, however, in a preferred embodiment the pipe fitting is 1.25" in diameter.

Figure 2:
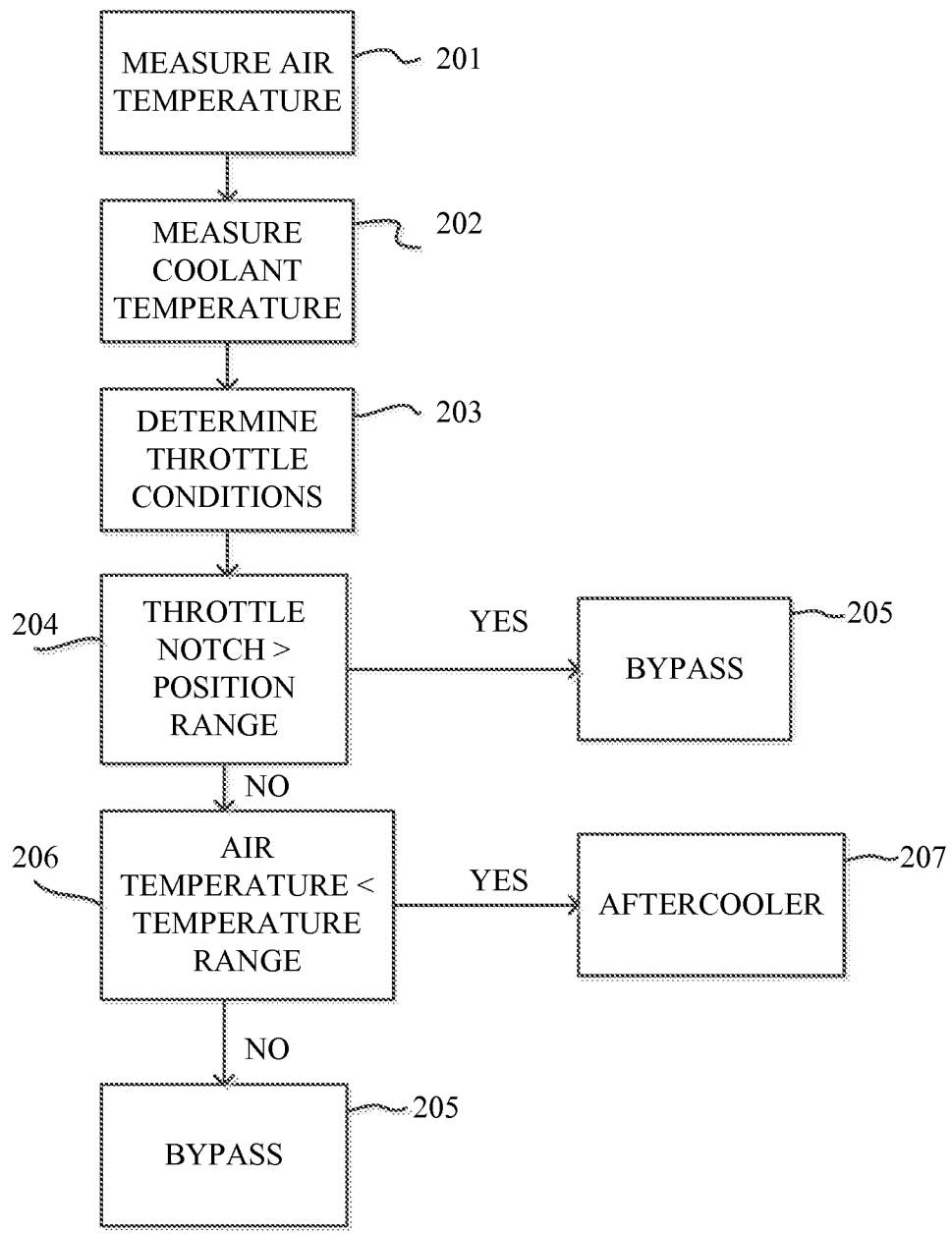
FIG. 2 is a flow chart illustrating a method for bypassing an aftercooler in accordance with one embodiment of the invention.

FIG. 2 illustrates a method for bypassing an aftercooler with a bypass valve according to one embodiment of the invention. The method begins with steps for collecting several engine condition measurements and determining engine operating conditions. These steps include steps for measuring the air temperature 201, and determining throttle conditions 202. Steps 201, and 202 may be performed in any particular order. Measuring air temperature 201 may comprise measuring the temperature of the ambient air or charge air by air temperature sensors 102 at locations on the air flow path described above. The method may optionally include a step for measuring coolant temperature (not pictured), which may comprise measuring the temperature of the coolant by coolant temperature sensors 116 as described above. Determining throttle conditions 202 may comprise determining throttle notch position as discussed above.

The method according to FIG. 2 then makes a determination whether the throttle notch position exceeds a predetermined range 203. For example, the method may determine whether the throttle notch position exceeds notch 4. If the throttle notch position exceeds the predetermined range, the coolant bypasses the aftercooler 204, via a bypass conduit as described above. In this way, charge air passing through the aftercooler may not to be warmed by the coolant. If the throttle notch position does not exceed the predetermined range, the method may then determine whether the air temperature exceeds a predetermined temperature range. For example, the method may determine whether the air temperature exceeds 70° F. If the method determines that the air temperature exceeds the predetermined temperature range, 205, coolant may be circulated through the aftercooler 206. Otherwise, the coolant bypasses the aftercooler 204 as described above.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

What is claimed is:

1. A cooling system for an internal combustion engine comprising:

a turbocharger; and
a single coolant loop comprising:
- a radiator,
- an engine coolant expansion tank,
- an aftercooler for receiving combustion air from the turbocharger, the aftercooler comprising an air-to-liquid heat exchanger for exchanging heat between the combustion air and a liquid coolant,
- an engine,
- a liquid coolant pump for continuously circulating liquid coolant throughout the single coolant loop,
- a liquid coolant bypass conduit that bypasses the aftercooler,
- a temperature sensor for measuring an ambient air temperature, and
- a three-way bypass valve for controlling a flow of the liquid coolant to the aftercooler and the liquid coolant bypass conduit, the three-way bypass valve comprising:
  - an inlet for receiving the liquid coolant from the expansion tank,
  - an outlet for supplying the liquid coolant to the aftercooler, and
  - an outlet for supplying the liquid coolant to the liquid coolant bypass conduit, wherein the three-way bypass valve diverts the liquid coolant to the aftercooler or diverts the liquid coolant to the liquid coolant bypass conduit based on a throttle position of the internal combustion engine and the measured ambient air temperature, and wherein the three-way bypass valve diverts the liquid coolant to the liquid coolant bypass conduit when the ambient air temperature is lower than a liquid coolant temperature.

2. The cooling system of claim 1, wherein the three-way bypass valve diverts the liquid coolant to the liquid coolant bypass conduit when the ambient air temperature is lower than a specified temperature.

3. The cooling system of claim 1, wherein the three-way bypass valve diverts the liquid coolant to the liquid coolant bypass conduit when the ambient air temperature is lower than a specified temperature and the throttle position of the internal combustion engine is within a specified range.

4. The cooling system of claim 1, further comprising a bypass control system that controls the three-way bypass valve, the bypass control system configured to receive information associated with the throttle position of the internal combustion engine and the ambient air temperature.

5. The cooling system of claim 1, wherein the liquid coolant is a heat transfer fluid selected from a group consisting of water, engine oil, and fuel.

6. The cooling system of claim 1, wherein the three-way bypass valve diverts all of the liquid coolant to the aftercooler or diverts all of the liquid coolant to the liquid coolant bypass conduit based on the throttle position of the internal combustion engine and the ambient air temperature.

7. The cooling system of claim 6, wherein the aftercooler is cooled by ambient air when the three-way bypass valve diverts all of the liquid coolant to the liquid coolant bypass conduit.

8. The cooling system of claim 1, wherein the throttle position of the internal combustion engine has an idle position and eight discrete notch positions, and wherein a load increase request is issued by moving the throttle position from a first notch position to a higher notch position.

9. The cooling system of claim 8, wherein the three-way bypass valve diverts the liquid coolant to the aftercooler when the ambient air temperature is below 70.degree. F.

10. The cooling system of claim 8, wherein the three-way bypass valve diverts the liquid coolant to the liquid coolant bypass conduit when the ambient air temperature is above 70.degree. F. and the throttle position of the internal combustion engine is in one of discrete notch positions idle, and one through four.

11. The cooling system of claim 1, wherein the three-way bypass valve is a pneumatic valve further comprising an air supply port and air exhaust port.

12. The cooling system of claim 11, further comprising:
- an air supply;
- a conduit for passing air from the air supply to the air supply port of the three-way bypass valve; and
- a magnet valve for controlling air flow to the three-way bypass valve.

13. The cooling system of claim 12, wherein a bypass control system controls the diversion of the liquid coolant in the three-way bypass valve by controlling the magnet valve.

14. The cooling system of claim 1, further comprising a pipe fitting for receiving the liquid coolant from the aftercooler and the three-way valve.

15. The cooling system of claim 14, wherein the pipe fitting is a welded tee.

16. The cooling system of claim 15, further comprising a bypass pipe connecting the aftercooler to the outlet for supplying the liquid coolant to the aftercooler.

17. The cooling system of claim 16, wherein the pipe fitting is 1.25 inches in diameter, and the bypass pipe is 1 inch in diameter.

18. A method for cooling an internal combustion engine having a turbocharger and a coolant loop, the method comprising the steps of:
- measuring an ambient air temperature by a temperature sensor;
- measuring a temperature of a liquid coolant that is continuously circulated in a single coolant loop, the single coolant loop comprising a radiator, an engine coolant expansion tank, and an aftercooler having an air-to-liquid heat exchanger for exchanging heat between a combustion air from an engine and the liquid coolant;
- determining a throttle position of the internal combustion engine, wherein a load increase request is issued by moving the throttle position from a first notch position to a higher notch position; and
- employing a three-way bypass valve to either circulate the liquid coolant to the aftercooler or circulate the liquid coolant to a liquid coolant bypass conduit that bypasses the aftercooler based on the ambient air temperature and the throttle position, wherein the three-way bypass valve diverts the liquid coolant to the liquid coolant bypass conduit when the ambient air temperature is lower than a temperature of the liquid coolant.

19. The method of claim 18, wherein the three-way bypass valve diverts the liquid coolant to the liquid coolant bypass conduit when the ambient air temperature is lower than a specified temperature.

20. The method of claim 18, further comprising the step of controlling the three-way bypass valve to divert all of the liquid coolant to the aftercooler or divert all of the liquid coolant to the liquid coolant bypass conduit based on a throttle position of the internal combustion engine and the ambient air temperature.

21. The method of claim 20, wherein the aftercooler is cooled by ambient air when the three-way bypass valve diverts all of the liquid coolant to the liquid coolant bypass conduit.

22. The method of claim 18, wherein the three-way bypass valve diverts the liquid coolant to the liquid coolant bypass conduit when the ambient air temperature is lower than a specified temperature and the throttle position is within a specified range.

23. The method of claim 11, wherein the three-way bypass valve diverts the liquid coolant to the aftercooler when the ambient air temperature is below 70.degree. F.

24. The method of claim 22, wherein the three-way bypass valve diverts the liquid coolant to the liquid coolant bypass conduit when the ambient air temperature is above 70.degree. F. and the throttle position is in one of discrete notch positions one through four.

* * * * *